United States Patent [19]
Marsh

[11] Patent Number: 5,944,416
[45] Date of Patent: Aug. 31, 1999

[54] DECORATION APPARATUS HAVING LIGHT PIPES POSITIONED BETWEEN FLEXIBLE SHEETS

[76] Inventor: Lee F. Marsh, 912 Windsor Rd., Glenview, Ill. 60025

[21] Appl. No.: 08/961,213

[22] Filed: Oct. 30, 1997

[51] Int. Cl.[6] .................................................. F21V 8/00
[52] U.S. Cl. .......................... 362/568; 362/565; 362/806
[58] Field of Search ............................. 362/32, 103, 806, 362/565, 567, 568

[56] References Cited

U.S. PATENT DOCUMENTS

| | | | |
|---|---|---|---|
| 3,781,537 | 12/1973 | Ramsey | 362/32 |
| 4,234,907 | 11/1980 | Daniel | 362/32 |
| 4,510,555 | 4/1985 | Mori | 362/32 |
| 4,559,583 | 12/1985 | Ku | 362/806 |
| 4,597,030 | 6/1986 | Brody et al. | 362/32 |
| 4,652,981 | 3/1987 | Glynn | 362/103 |
| 4,727,603 | 3/1988 | Howard | 362/806 |
| 4,754,372 | 6/1988 | Harrison . | |
| 4,875,144 | 10/1989 | Wainwright . | |
| 4,907,132 | 3/1990 | Parker | 362/32 |
| 4,975,809 | 12/1990 | Ku . | |
| 4,977,487 | 12/1990 | Okano . | |
| 4,998,186 | 3/1991 | Cocca . | |
| 5,021,928 | 6/1991 | Daniel | 362/806 |
| 5,036,435 | 7/1991 | Tokuda et al. | 362/32 |
| 5,040,320 | 8/1991 | Reidinger . | |
| 5,097,396 | 3/1992 | Myers . | |
| 5,226,709 | 7/1993 | Labranche . | |
| 5,249,105 | 9/1993 | Koizumi | 362/806 |
| 5,307,245 | 4/1994 | Myers et al. | 362/32 |
| 5,347,437 | 9/1994 | Cocca et al. . | |
| 5,367,440 | 11/1994 | Gruszcynski et al. | 362/32 |
| 5,461,548 | 10/1995 | Esslinger et al. . | |
| 5,517,390 | 5/1996 | Zins . | |
| 5,639,157 | 6/1997 | Yeh . | |
| 5,649,755 | 7/1997 | Rapisarda . | |

*Primary Examiner*—Laura K. Tso
*Attorney, Agent, or Firm*—Pauley Petersen Kinne & Fejer

[57] ABSTRACT

A decoration apparatus having two flexible sheets of material that are adhered either directly or indirectly to each other. A plurality of light pipes are positioned or sandwiched between a front face of a first flexible sheet and a rear face of a second flexible sheet. A light source supplies light to the light pipes to produce a decorative effect.

12 Claims, 1 Drawing Sheet

DECORATION APPARATUS HAVING LIGHT PIPES POSITIONED BETWEEN FLEXIBLE SHEETS

BACKGROUND OF THE INVENTION

1. Field of the Invention

This invention relates to a decoration apparatus having two flexible sheet materials adhered with respect to each other wherein a plurality of light pipes are positioned between the first flexible sheet material and the second flexible sheet material.

2. Description of Prior Art

U.S. Pat. No. 4,975,809 teaches a greeting card having an internally light-transmissive, peripherally light intrareflective panel which is edge-illuminated. FIG. 3a of U.S. Pat. No. 4,975,809 shows a plurality of terminal ends of fiber optics embedded in edges of a panel.

U.S. Pat. No. 4,754,372 teaches an illuminable covering of a fibrous material, such as a floor covering. A plurality of fiber optics are each routed between a compressible backing, such as foam padding, and a primary backing. Each fiber optic penetrates the primary backing and is routed through pile yarns, so that a terminal free end of the fiber optic is positioned approximately adjacent free ends of the pile yarns.

U.S. Pat. No. 5,649,755 discloses a light-emitting apparatus that passes light into one end of a length of clear flexible material. The length of clear flexible material has a plurality of slits or other marks that interrupt light which passes through the clear flexible material. The light source is positioned to emit light rays into an end portion of the clear flexible material. The light-emitting apparatus is preferably worn on clothing.

U.S. Pat. No. 4,977,487 teaches an apparatus for taillights, such as those used with a vehicle, wherein a plurality of optical fibers are positioned between a rigid reflective plate and a lens plate.

In view of known prior art, it is apparent that there exists a need for a decoration apparatus that uses a plurality of fiber optics or other light pipes to emit light in such a manner that produces a decorative effect.

SUMMARY OF THE INVENTION

It is one object of this invention to provide a decoration apparatus that has a plurality of light pipes, such as fiber optics, positioned between two flexible sheets of material.

It is another object of this invention to provide a decoration apparatus wherein a plurality of light pipes are positioned between two flexible sheets of material that are adhered to each other.

The above and other objects of this invention are accomplished with a decoration apparatus that can either be supported from a structure, such as a wall, or that can be rolled-up, such as a window shade. A first flexible sheet material, which can have a rectangular shape, a circular shape, an oval shape or any other suitable two-dimensional shape, is preferably but not necessarily opaque, transparent or translucent. A second flexible sheet material is positioned adjacent to the first flexible sheet material. The second sheet material is preferably but not necessarily opaque, transparent or translucent and/or can be of a different color, a different shape or even a different texture than the first flexible sheet material.

A plurality of light pipes are sandwiched between the two flexible sheet materials. The light pipes, for example, can be a cluster of fiber optics each having an end which terminates in a fashion that produces an illuminated effect, such as a tree light for a Christmas tree or such as letters or numbers for a sign.

The light pipes can be of any suitable light emitting source. Fiber optics are particularly suitable, but not necessary, for positioning between the two flexible sheet materials. A light source is applied to the light pipes. The light source can be a light bulb or any other suitable apparatus that supplies light rays.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
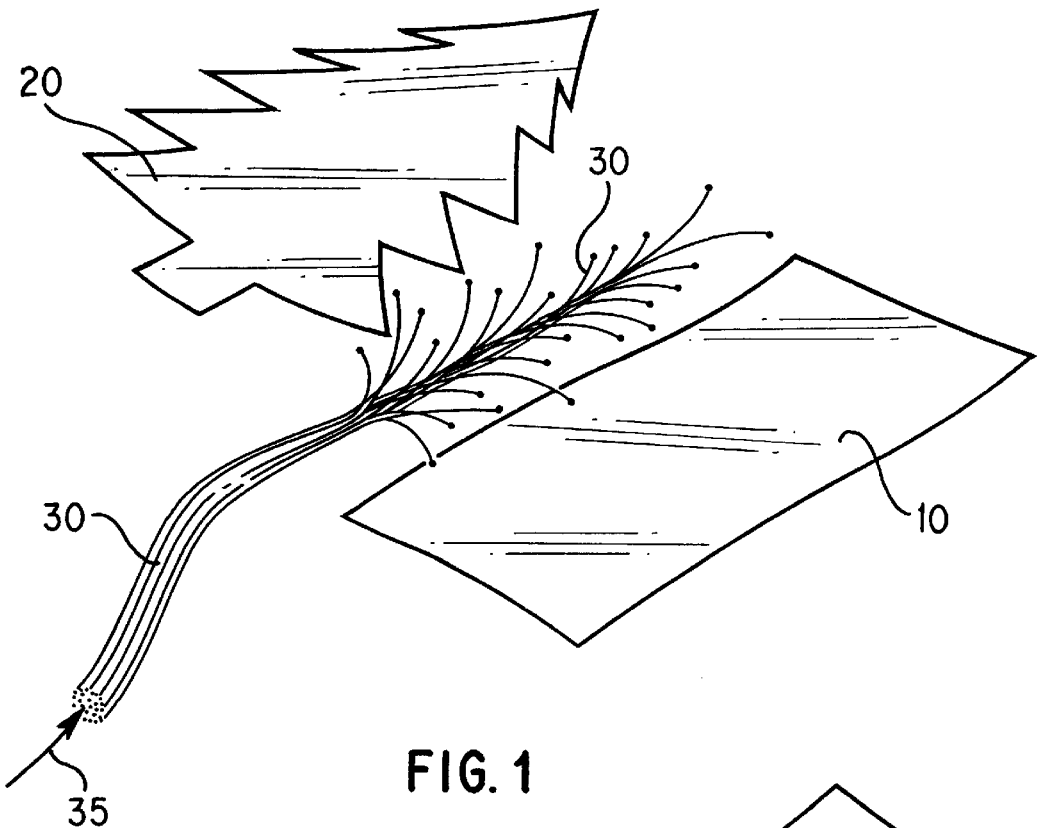
FIG. 1 is an exploded view of a decoration apparatus having a plurality of light pipes positioned between two flexible sheet materials, according to one preferred embodiment of this invention.
Figure 2:
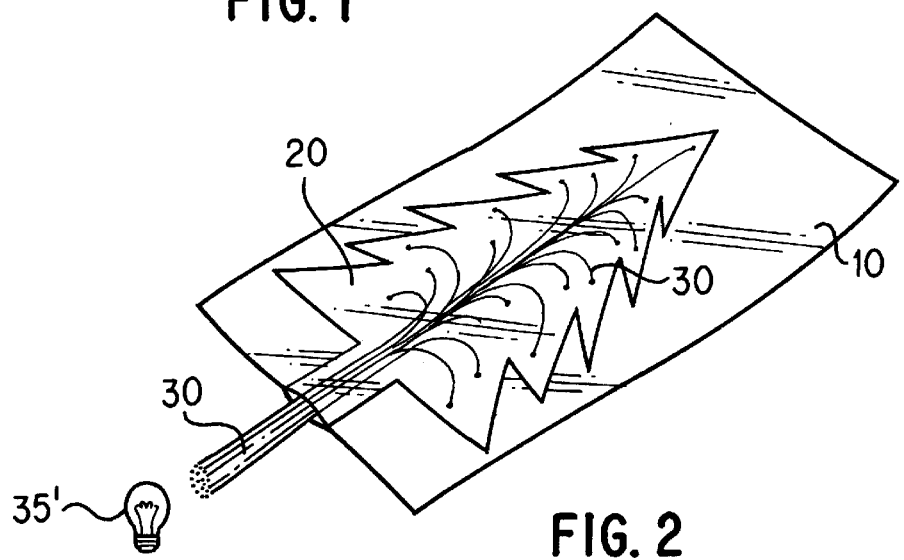
FIG. 2 is a perspective view of the decoration apparatus as shown in FIG. 1.

FIGS. 1 and 2 show one preferred embodiment of a decoration apparatus according to this invention. As shown in FIGS. 1 and 2, the decoration apparatus displays contrasting shapes which together resemble a Christmas tree; however, it is apparent that other decorative shapes can be used to accomplish the same result of communicating an expression, particularly a contrasting expression, that produces a decorative effect.

Figure 3:
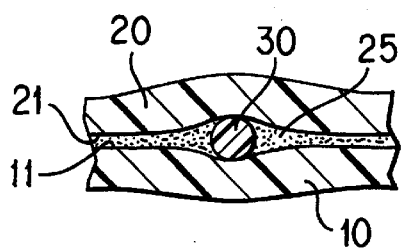
FIG. 3 is a partial sectional view showing one light pipe positioned between two flexible sheet materials which are adhered to each other with a layer of adhesive.

FIG. 3 shows a partial sectional view of one light pipe 30 positioned between flexible sheet 10 and flexible sheet 20. Also as shown in FIG. 3, according to one preferred embodiment of this invention, adhesive layer 25 is used to adhere front face 11 of flexible sheet 10 to rear face 21 of flexible sheet 20. As used throughout this specification and in the claims, the phrase adhered to is intended to relate to flexible sheet 10 positioned in a contiguous relationship with respect to flexible sheet 20. It is apparent that in lieu of adhesive layer 25, heat-welding techniques or other suitable chemicals or glues can be used to bond, fix or secure flexible sheet 10 either directly to or indirectly to flexible sheet 20.

As shown in the exploded view of FIG. 1, flexible sheet 10 has an overall rectangular shape. However it is apparent that flexible sheet 10 and/or flexible sheet 20 can have a circular, oval or any other suitable two-dimensional shape. In one preferred embodiment of this invention, one of flexible sheet 10 and flexible sheet 20 is preferably but not necessarily opaque. In such preferred embodiment, the other of flexible sheet 10 and flexible sheet 20 is transparent or translucent. As shown in FIG. 1, flexible sheet 20 is of a different shape a different texture and a different tint than flexible sheet 10. It is preferred but not necessary that flexible sheet 10 and flexible sheet 20 have different shapes, different shades, different tints, different colors and/or any other difference that produces a decorative contrast between flexible sheet 10 and flexible sheet 20.

A plurality of light pipes are preferably sandwiched or positioned between sheet material 10 and sheet material 20.

FIG. 1 shows the decoration apparatus of this invention in an exploded view and FIG. 2 shows the same decoration apparatus of this invention in an assembled view, according to one preferred embodiment. Light pipes 30, for example, can be a cluster of fiber optics with ends terminated in a fashion that produces an illuminated effect, such as tree lights for a Christmas tree as shown in FIG. 2. Light pipes 30 can be of any other suitable light emitting construction; however, fiber optics are particularly suitable for positioning between flexible sheet 10 and flexible sheet 20, such as shown in FIG. 3.

Light source 35 is positioned near or applied to light pipes 30. In one preferred embodiment according to this invention, as shown in FIG. 1, light source 35 is applied to terminal ends of light pipes 30. Light source 35 may comprise a light bulb, 35 as shown in FIG. 2 or any other suitable lighting apparatus that supplies light rays.

In one preferred embodiment according to this invention, either flexible sheet 10 or flexible sheet 20 is opaque. It is possible to use an opaque material when it is desired to achieve a decorative effect by preventing at least some light from passing through either flexible sheet 10 or flexible sheet 20. However, in another preferred embodiment of this invention, both flexible sheet 10 and flexible sheet 20 are of a transparent or translucent material. In one preferred embodiment according to this invention, flexible sheet 10 and/or flexible sheet 20 comprise an acetate material or any other suitable material that is preferably flexible and durable.

It is apparent that a process for adhering flexible sheet 10 either directly or indirectly to flexible sheet 20 may comprise an automated process or a manual process.

It is apparent that various materials can be substituted for the materials discussed in this specification and in the claims. Persons skilled in the art know of different conventional materials which can be substituted while maintaining the desired result, producing a decorative effect by contrasting color, shape, tint, material and/or the light between the two flexible sheets 10 and 20.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerable without departing from the basic principles of the invention.

I claim:

1. A decoration apparatus comprising:
a first flexible sheet having a front face, a second flexible sheet having a rear face, a plurality of light pipes positioned between said front face and said rear face, a light source supplying light to said light pipes, at least a portion of said front face adhered to at least a portion of said rear face, and said first flexible sheet heat-welded to said second flexible sheet and adhering said at least a portion of said front face to said at least a portion of said rear face.

2. A decoration apparatus according to claim 1 wherein at least a portion of at least one of said first flexible sheet and said second flexible sheet comprises an opaque material.

3. A decoration apparatus according to claim 1 wherein at least a portion of at least one of said first flexible sheet and said second flexible sheet comprises a transparent material.

4. A decoration apparatus according to claim 1 wherein at least a portion of at least one of said first flexible sheet and said second flexible sheet comprises a translucent material.

5. A decoration apparatus according to claim 1 wherein a layer of adhesive positioned between and in contact with said first flexible sheet and said second flexible sheet adheres at least a second portion of said front face to at least a second portion of said second face.

6. A decoration apparatus according to claim 1 wherein said first flexible sheet is of a different shape than said second flexible sheet.

7. A decoration apparatus according to claim 1 wherein said first flexible sheet is of a different color than said second flexible sheet.

8. A decoration apparatus according to claim 1 wherein said first flexible sheet is of a different tint than said second flexible sheet.

9. A decoration apparatus according to claim 1 wherein said first flexible sheet is of a different texture than said second flexible sheet.

10. A decoration apparatus according to claim 1 wherein said light pipes comprise a cluster of fiber optics.

11. A decoration apparatus according to claim 10 wherein said fiber optics each have an end that terminates in a position between said first flexible sheet and said second flexible sheet.

12. A decoration apparatus according to claim 1 wherein said light source comprises a light bulb positioned to emit light to an end of each said light pipe.

\* \* \* \* \*